United States Patent [19]

Evans et al.

[11] Patent Number: 5,164,849
[45] Date of Patent: Nov. 17, 1992

[54] LIQUID CRYSTAL DISPLAY WITH A FAST WARM UP

[75] Inventors: Lansing B. Evans, Boca Raton; Robert W. Brown, Coral Springs, both of Fla.

[73] Assignee: Allied-Signal Inc., Morris Township, Morris County, N.J.

[21] Appl. No.: 593,160

[22] Filed: Oct. 5, 1990

[51] Int. Cl.$^5$ .................. G02F 1/13; G02F 1/135; G02F 1/133; G09G 3/36
[52] U.S. Cl. ........................................ 359/45; 359/72; 359/86; 340/784
[58] Field of Search ............... 340/770, 784; 359/45, 359/48, 86, 72

[56] References Cited

U.S. PATENT DOCUMENTS

| | | | |
|---|---|---|---|
| 3,898,977 | 8/1975 | Draper | 126/200 |
| 4,029,393 | 6/1977 | Dungan et al. | 350/351 |
| 4,093,355 | 6/1978 | Kaplit et al. | 350/334 |
| 4,119,842 | 10/1978 | Hayden et al. | 359/86 X |
| 4,128,311 | 12/1978 | Smith et al. | 350/331 |
| 4,297,697 | 10/1981 | Mitsui | 340/813 |
| 4,493,984 | 1/1985 | Yamauchi | 219/501 |
| 4,625,163 | 11/1986 | Germer | 324/103 R |
| 4,659,183 | 4/1987 | Suzawa | 350/345 |
| 4,682,857 | 7/1987 | Tan | 350/331 T |
| 4,687,956 | 8/1987 | Itoh et al. | 307/310 |
| 4,721,363 | 1/1988 | Inoue | 350/331 T |
| 4,760,389 | 7/1988 | Aoki et al. | 350/345 X |
| 4,773,735 | 9/1988 | Ukrainsky et al. | 350/331 T |
| 4,807,972 | 2/1989 | Klosterboer | 350/331 T |
| 4,819,186 | 4/1989 | Ohta et al. | 350/332 X |
| 4,987,289 | 1/1991 | Bishop et al. | 350/331 T X |

FOREIGN PATENT DOCUMENTS

| | | | |
|---|---|---|---|
| 2807282 | 8/1979 | Fed. Rep. of Germany | 350/345 |
| 61-285429 | 12/1986 | Japan | 350/345 |
| 63-313134 | 12/1988 | Japan | 350/331 T |
| 1-006927 | 1/1989 | Japan | 350/331 T |

*Primary Examiner*—William L. Sikes
*Assistant Examiner*—Ron Trice
*Attorney, Agent, or Firm*—Howard G. Massung; Robert A. Walsh

[57] ABSTRACT

Display apparatus and method having window shade heating. The display has an active matrix LCD with a plurality of elements and a backlight having a variable brightness. During warm-up of the display, the operating temperature will be below the normal operating temperature. To decrease warm-up time, the LCD elements are darkened and the brightness of the backlight is increased.

9 Claims, 1 Drawing Sheet

LIQUID CRYSTAL DISPLAY WITH A FAST WARM UP

BACKGROUND OF THE INVENTINO

This invention relates to displays. More specifically, this invention relates to displays requiring a quick warm-up time.

Present displays used in cockpits of airplanes typically include an array of liquid crystal display (LCD) elements and a backlight for illuminating those elements. Such displays require an undesirably long period of time for warm-up during which dynamic performance of the LCD is unacceptable so that displays are smeared or not properly updated. Furthermore, the low brightness of the backlight during the warm-up period can make viewing difficult. The warm-up time of displays used in the cockpits of airplanes, for example, can be as long as thirty minutes for some displays.

It is, therefore, desirable to decrease the warm-up time of such displays. One approach to decreasing the warm-up time is to utilize extra heater elements in the display. These heater elements are turned on during the warm-up period to generate extra heat and then are turned off once the normal operational temperature of the display is reached, thereby decreasing warm-up time. A 40 or 50 watt heater element, for example, can reduce the warm-up time to as little as ten minutes in some displays.

The addition of such elements, however, create a potentially hazardous situation. For example, if the heater element were to fail such that the extra heat were continually generated, the electronics in the display could fail. An even worse scenario would result if the components or wiring in the display burned and generated smoke. Such a condition in a cockpit would endanger the airplane and its contents.

SUMMARY OF THE INVENTION

In a preferred embodiment, the present invention preferably includes a display having liquid crystal display elements, a backlight having a variable brightness for illuminating the liquid crystal display elements and control means for darkening the liquid crystal display elements and for increasing the brightness of the backlight for a period of time when the display is warming up In another embodiment, a sensor having an output indicative of the operating temperature of the display is provided and the control means darkens the liquid crystal display elements and increases the brightness of the backlight until the output of the sensor exceeds a predetermined threshold.

It is an object of the present invention to provide a display without extra heater elements having a short warm-up time.

It is another object of the present invention to provide a display having a short warm-up time without increasing the failure rate of the display.

DESCRIPTION OF THE PREFERRED EMBODIMENT

Figure 1:
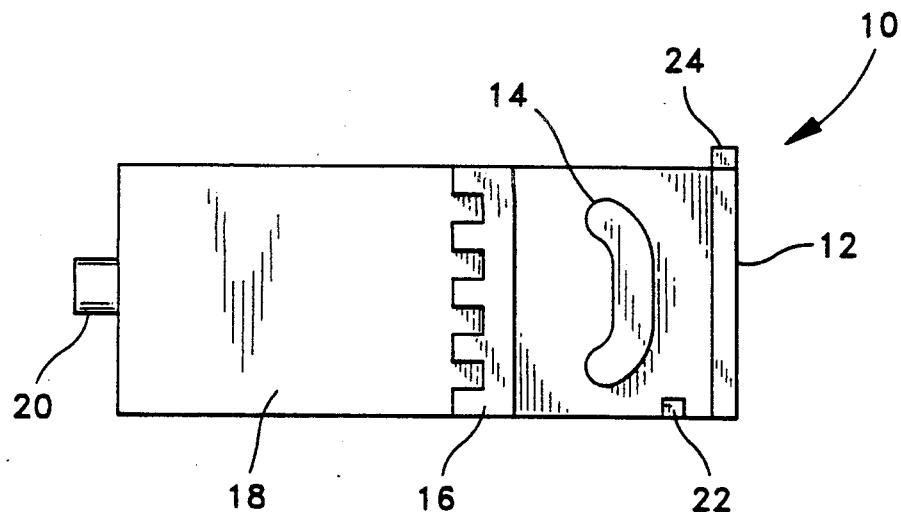
FIG. 1 illustrates a preferred display.
Figure 2:
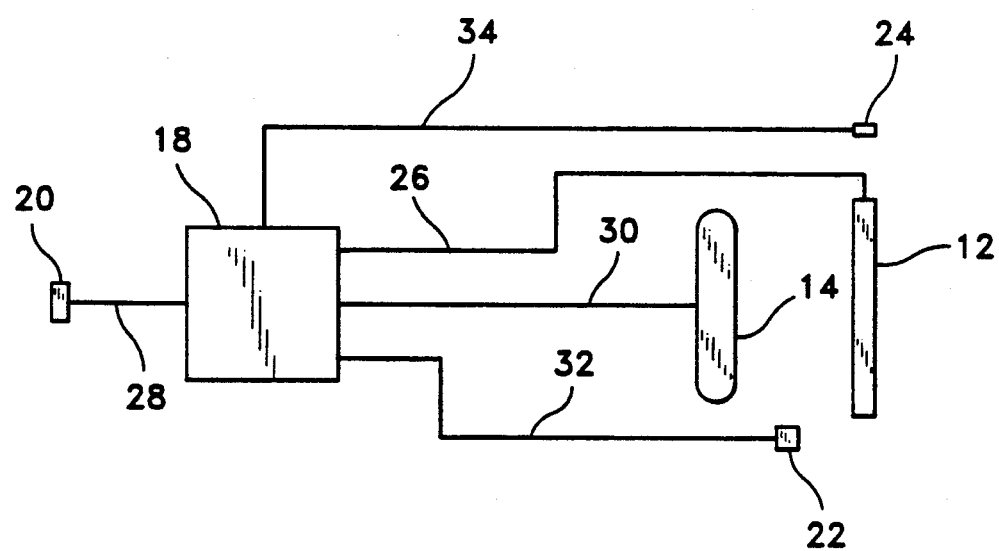
FIG. 2 illustrates a preferred block diagram of the electronics in the display of FIG. 1.

FIG. 1 illustrates the physical layout of a preferred display 10 for the cockpit of an aircraft. FIG. 2 illustrates a block diagram of the electronics of the preferred display 10. The display includes an active matrix LCD 12, a backlight 14, a heat sink 16, power supply and drive electronics 18, a rear connector 20, a temperature sensor 22 and a light sensor 24.

The active matrix LCD 12 has a plurality of LCD elements which are electrically connected to the drive electronics 18 by a line 26. During normal operation of the display 10, the elements of the active matrix LCD 12 are individually controlled by the power supply and drive electronics 18 in accordance with the information obtained on the line 28 through the rear connector 20 to display information.

The backlight 14 is a lamp which is shaped and positioned behind the active matrix LCD 12 to provide illumination of each element in the active matrix LCD 12 so that an image can be displayed on the display 10.

In a small cockpit display, the backlight 14 typically generates approximately 10 watts of energy, however, it can be as high as 60 watts. During normal operation of the display 10, the heat generated by the backlight 14 is not desirable for operation of the display 10 and should be efficiently dissipated. A heat sink 16, therefore, is preferably thermally bonded to the backlight 14 to assist in the removal of the heat generated in the operation of the backlight 14.

The backlight 14 has a variable brightness which is controlled by the power supply and drive electronics 18 on a line 30. During normal operation of some displays, it is preferred to control the brightness level of the backlight 14 in accordance with the brightness of light external to the display to improve the visibility of the displayed image. This can be accomplished by sensing the brightness of the light external to the display with the light sensor 24. The output of the sensor 24 is fed to the power supply and drive electronics 18 on a line 34. The power supply and drive electronics 18 controls the brightness of the backlight 14 accordingly. For example, if the brightness of the light external to the display 10 is low, the brightness of the backlight 14 could be lowered. On the other hand, if the brightness of the light external to the display 10 is high, the brightness of the backlight 14 could be increased so that the display 10 remains visible.

The power supply and drive electronics 18 is preferably positioned in the rear of the display 10. As mentioned before, this circuitry 18 controls the image displayed on the active matrix LCD 12. It also controls the brightness of the backlight 14 with a signal on the line 30. Further, the power supply and drive electronics 18 also supplies power to the display 10. In accordance with the invention, the power is generated by a switching power supply in the power supply and drive electronics 18 that switches at a predetermined frequency.

The temperature sensor 22 is preferably provided to sense the internal operating temperature of the display 10. The sensor 22 has an input to the power supply and drive electronics 18 on a line 32. The output of the sensor 22 is dependent on its positioning inside the display.

During warm-up of the display 10, particularly from a cold start, the internal operating temperature of the display 10 is below a normal operating temperature of the display 10. As a result, the display 10 is of limited use since the active matrix LCD 12 has limited dynamic performance and the backlight output may not be sufficient. The use limitation continues until the normal operating temperature in the display 10 is reached. As a result, it is preferred to keep the warm-up time of the display 10 as short as possible.

To accomplish this in accordance with the present invention, the power supply and drive electronics 18 increases the brightness of the backlight 14 in a predetermined manner when the display 10 has an internal operating temperature which is below a predetermined threshold, for example, when the display 10 is initially turned on and warming-up. The increased brightness causes the backlight 14 to generate more heat so as to decrease the warm-up time. It is preferred to increase the brightness of the backlight 14 to its maximum, thereby creating maximum heat.

In a preferred embodiment of the present invention, the power supply and drive electronics 18 darken all of the elements in the active matrix LCD 12 when the brightness of the backlight 14 is increased. The darkened elements in the active matrix LCD 12 limit the amount of light being emitted bY the display 10.

In another preferred embodiment, the brightness is increased and the elements are darkened only during the initial warm-up period when the display 10 has been initially turned on. By limitinq the brightness increase and the darkening of the elements to the initial warm-up period, information is kept from a user of the display 10 only during the initial warm-up time.

The warm-up time of the display 10 is typically characterized by the internal operating temperature of the display 10. For example, when the display 10 is initially turned on, the internal operating temperature is very low and, as a result, the display 10 functions poorly. During warm-up, the internal operating temperature gradually increases until it reaches a steady state value. The steady state value reached depends on surrounding circumstances, for example, the temperature outside the display.

In one embodiment of the present invention, the time for the internal operating temperature of a disPlay to reach a predetermined value is experimentally determined before final installation of the display and the circuit 18 is programmed to control the active matrix LCD 12 and/or the backlight 14 as before described. In a preferred embodiment, the circuit 18 includes a timer. The timer would be programmed to count for an interval equal to the experimentally determined time. The timer would be enabled during the initial power-up of the display 10 and would stop when the final count was reached. The circuit 18 would be enabled during the time the timer is counting.

Depending upon the quality of the elements in the active matrix LCD 12, some of the light from the backlight 14 may escape the display 10 even when all of the elements in the active matrix LCD 12 are darkened. Such a situation would be acceptable in cases where bright light conditions existed external to the display 10. In cases where the conditions external to the display 10 were dark, however, the escaping light could cause difficulties. To correct for any potential problems, the power supply and drive electronics 18, in a preferred embodiment, monitors the sensor 24 to determine the external lighting conditions during warm-uP. The power supply and drive electronics 18 controls the brightness level of the backlight 14 accordingly. For example, if the power supply and drive electronics 18 were to determine that the cockpit in which the display 10 was installed was dark, the power supply and drive electronics 18 could lower the brightness of the backlight 14 accordingly. In general, the brightness of the backlight 14 would be directly related to the brightness of the light external to the display.

In another embodiment of the present invention, the power supply and drive electronics 18 monitors the output of the temperature sensor 22 on the line 30 to determine the internal operating temperature of the display 10 during warm-up. The power supply and drive electronics 18 increases the brightness level of the backlight 14 and preferably darkens the elements of the active matrix LCD 12 while the output of the temperature sensor 22 is below a predetermined threshold value. The predetermined threshold value can be the steady state operating temperature or some value below the steady state value where the display 10 performs acceptably. When the output of the temperature sensor 22 exceeds the predetermined threshold value, the power supply and drive electronics 18 determines that the normal operating temperature of the display 10 has been reached and controls the active matrix LCD 12 and the backlight 14 in accordance with normal procedures.

We claim:

1. A display having an internal operating temperature, comprsiing:
   a plurality of liquid crystal display elements;
   a backlight having variable brightness and positioned for illuminating said plurality of liquid crystal display elements; and
   control means connected to said backlight for increasing said brightness of said backlight and darkening said plurality of liquid crystal display elements during an initial warm-up period when the internal operating temperature is below a predetermined threshold.

2. The display as claimed in claim 1, wherein said control means increases said brightness and darkens said plurality of liquid crystal display elements during a warm-up time of predetermined duration.

3. The display as claimed in claim 1, further comprising:
   a sensor having an output indicative of lighting conditions external to the display;
   wherein said brightness of said backlight is controlled in accordance with said output from said sensor and the internal operating temperature.

4. The display as claimed in claim 1, further comprising:
   a first sensor having an output indicative of the internal operating temperature of the display;
   wherein said control means darkens said plurality of liquid crystal display elements and increases said brightness if said output of said first sensor is below said predetermined threshold.

5. The display as claimed in claim 4, wherein said brightness is increased to a maximum.

6. The display as claimed in claim 4, further comprising:
   a second sensor having an output indicative of the lighting conditions external of the display;
   wherein said brightness of said backlight is controlled in accordance with said outputs of said first and second sensors.

7. A method of controlling a display having liquid crystal display elements and a backlight for illuminating the elements, the display having an internal operating temperature, comprising the step of increasing the brightness of the backlight and darkening the elements during an initial warm-up period when the internal operating temperature is below a predetermined threshold.

8. The method as claimed in claim 7, wherein the brightness is increased and teh elements darkened during a warm-up time of predetermined duration.

9. The method as claimed in claim 7, further comprising the steps of sensing lighting conditions external to the display and increasing the brightness of the backlight in accordance with the sensed conditions and the internal operating temperature.

* * * * *